(12) United States Patent
Sasakawa et al.

(10) Patent No.: US 9,403,129 B2
(45) Date of Patent: Aug. 2, 2016

(54) HOLLOW FIBER MEMBRANE MODULE

(75) Inventors: Manabu Sasakawa, Toyohashi (JP); Tetsuya Torichigai, Toyohashi (JP); Hiroyuki Okazaki, Toyohashi (JP); Fumihiro Kira, Toyohashi (JP); Ikuo Kinoshita, Toyohashi (JP)

(73) Assignee: Mitsubishi Rayon Co., Ltd., Tokyo (JP)

(*) Notice: Subject to any disclaimer, the term of this patent is extended or adjusted under 35 U.S.C. 154(b) by 0 days.

(21) Appl. No.: 13/978,268

(22) PCT Filed: Dec. 7, 2011

(86) PCT No.: PCT/JP2011/078306
§ 371 (c)(1),
(2), (4) Date: Jul. 17, 2013

(87) PCT Pub. No.: WO2012/093546
PCT Pub. Date: Jul. 12, 2012

(65) Prior Publication Data
US 2013/0327697 A1 Dec. 12, 2013

(30) Foreign Application Priority Data
Jan. 4, 2011 (JP) .................... 2011-000153

(51) Int. Cl.
*B01D 63/02* (2006.01)
*B01D 63/04* (2006.01)

(52) U.S. Cl.
CPC .............. *B01D 63/04* (2013.01); *B01D 63/02* (2013.01); *B01D 2313/02* (2013.01); *B01D 2313/12* (2013.01); *B01D 2313/21* (2013.01); *B01D 2315/06* (2013.01)

(58) Field of Classification Search
CPC ...... B01D 63/02; B01D 63/04; B01D 63/043; B01D 63/022; B01D 63/125; B01D 2313/06; B01D 2313/08; B01D 2313/21; B01D 2313/02; B01D 2313/12; B01D 2201/29; B01D 2201/301; B01D 2201/305; B01D 2201/306; B01D 2201/4084; C02F 3/1273; C02F 3/06

USPC ........ 210/321.87–9, 500.23, 232, 323.2, 435, 210/445, 236, 321.6, 238, 224, 227, 453; 403/381, 338, 110; 33/373
See application file for complete search history.

(56) References Cited

U.S. PATENT DOCUMENTS 3,734,298 A 5/1973 Riede et al.
3,979,295 A 9/1976 Markley
(Continued)

FOREIGN PATENT DOCUMENTS

JP 4 310219 11/1992
JP 11-009969 A 1/1999
(Continued)

OTHER PUBLICATIONS

International Search Report Issued Mar. 5, 2012 in PCT/JP11/78306 Filed Dec. 7, 2011.
(Continued)

*Primary Examiner* — David C Mellon
*Assistant Examiner* — Pranav Patel
(74) *Attorney, Agent, or Firm* — Oblon, McClelland, Maier & Neustadt, L.L.P

(57) ABSTRACT

A hollow fiber membrane module in which a housing body forming the hollow fiber membrane module includes an insertion opening into which end parts of the plurality of hollow fiber membranes are inserted so as to be fixed and held, and an opening portion which exposes open end surfaces of a plurality of hollow fiber membranes inserted from the insertion opening to outside, and a cover that blocks the opening portion of the housing body. According to the present invention, it is possible to provide a housing enabling open end surfaces of hollow fiber membranes to be sealed by easily exposing the open end surfaces of the hollow fiber membranes when the hollow fiber membranes are damaged.

19 Claims, 8 Drawing Sheets

(56) References Cited

U.S. PATENT DOCUMENTS

| | | | | |
|---|---|---|---|---|
| 4,342,723 | A | * | 8/1982 | Sado et al. ............... 422/48 |
| 4,477,092 | A | * | 10/1984 | Bush ........................ 277/322 |
| 5,078,530 | A | * | 1/1992 | Kim ........................... 403/24 |
| 6,217,835 | B1 | * | 4/2001 | Riley ..................... A61L 2/26 206/1.5 |
| 2004/0045893 | A1 | * | 3/2004 | Watanabe et al. ........ 210/321.79 |
| 2005/0089367 | A1 | * | 4/2005 | Sempliner ................. 403/381 |
| 2006/0113226 | A1 | * | 6/2006 | Breitner et al. ............... 210/95 |
| 2007/0131605 | A1 | | 6/2007 | Watari et al. |
| 2010/0155334 | A1 | * | 6/2010 | Taniguchi ............ B01D 63/02 210/650 |

FOREIGN PATENT DOCUMENTS

| | | |
|---|---|---|
| JP | 2004 49976 | 2/2004 |
| JP | 2008 12414 | 1/2008 |
| JP | 2009 195844 | 9/2009 |
| WO | 2005 042133 | 5/2005 |
| WO | WO 2006/037234 A1 | 4/2006 |
| WO | WO 2008/141080 A1 | 11/2008 |

OTHER PUBLICATIONS

Extended European Search Report dated May 17, 2016, in European Patent Application No. 11855199.3.

* cited by examiner

HOLLOW FIBER MEMBRANE MODULE

TECHNICAL FIELD

The present invention relates to a hollow fiber membrane module used for a solid-liquid separation operation such as water treatment.

Priority is claimed on Japanese Patent Application No. 2011-000153, filed Jan. 4, 2011, the content of which is incorporated herein by reference.

BACKGROUND ART

A hollow fiber membrane module is used as a filtration medium in various usages such as producing of sterile water, drinking water, and high pure water, air purification, and the like. The hollow fiber membrane module is manufactured in various forms such as a form in which hollow fiber membranes are bundled, and a form in which hollow fiber membranes with a sheet shape are stacked (refer to Patent Literature 1).

A hollow fiber membrane module with a form in which hollow fiber membranes are stacked is also called a flat hollow fiber membrane module, and a plurality of stacked hollow fiber membranes are fixed with a housing (refer to Patent Literature 2). The plurality of hollow fiber membranes are accommodated in the housing in a state in which both ends thereof are open. In addition, a gap between the housing and the hollow fiber membrane is sealed with a potting resin, and an assembly in which the hollow fiber membranes are formed in a sheet shape is structurally supported and fixed into the housing.

CITATION LIST

Patent Literature

[Patent Literature 1] Japanese Unexamined Patent Application, First Publication No. H4-310219
[Patent Literature 2] Japanese Unexamined Patent Application, First Publication No. 2009-195844

SUMMARY OF INVENTION

Technical Problem

However, in a case where the hollow fiber membranes are damaged due to scratch or the like in a solid-liquid separation device using the hollow fiber membrane module, a flaw of an outer surface of a damaged hollow fiber membrane is required to be blocked such that a liquid to be treated which has not been filtrated is prevented from penetrating into a housing which is a space after filtration. However, a hollow fiber membrane module in the related art is immersed into a contaminated liquid to be treated because of its nature, and thus there is a problem that contamination is awful and it is difficult to find a damaged part.

The present invention has been made in consideration of these circumstances, and an object thereof is to provide a housing for a hollow fiber membrane module capable of exposing an open end surface of the hollow fiber membrane so as to easily determine a damaged part when a hollow fiber membrane is damaged.

Solution to Problem

As solutions to the problems, a first aspect of the present invention relates to (1) a hollow fiber membrane module including a plurality of hollow fiber membranes that are arranged in a sheet form; and a housing that fixes the hollow fiber membranes, in which the housing includes a housing body that is provided with an insertion opening into which end parts of the plurality of hollow fiber membranes are inserted and which is sealed with a fixing resin, and an opening portion which is formed in a longitudinal direction of the plurality of hollow fiber membranes and is provided so as to perform maintenance of open end surfaces of the plurality of hollow fiber membranes; and a cover that blocks the opening portion of the housing body such that the housing body is allowed to be opened and closed.

A second aspect of the present invention relates to (2) the hollow fiber membrane module according to (1) in which the opening portion is formed in the longitudinal direction along the housing, and exposes all the open end surfaces of at least one side of the plurality of hollow fiber membranes.

A third aspect of the present invention relates to (3) the hollow fiber membrane module according to (2), further including a pair of long fastening members that fastens a joining portion between the housing body and the cover so as to correspond to a width direction of the hollow fiber membrane module, in which a groove in which a width of the fastening member becomes larger toward inside is formed in each fastening member in the longitudinal direction, and in which guide portions which are fitted to the groove in a state of being covered by the groove are respectively formed in the housing body and the cover.

A fourth aspect of the present invention relates to (4) the hollow fiber membrane module according to (3), in which the groove has a dovetail-groove shape.

A fifth aspect of the present invention relates to (5) the hollow fiber membrane module according to (3) or (4), in which each of the guide portions of the cover and the housing body has a shape of which a width increases toward an outside of the guide portion.

A sixth aspect of the present invention relates to (6) the hollow fiber membrane module according to any one of (3) to (5), in which the fastening member is divided into two or more in a longitudinal direction of the fastening member.

Advantageous Effects of Invention

According to the first aspect of the present invention, when the cover is opened, and the open end surfaces of the hollow fiber membranes are observed, it is most easily checked whether or not the filtration surfaces are damaged. Therefore, a damaged state of the hollow fiber membranes can be easily checked and a maintenance process such as sealing the open end surfaces of the hollow fiber membranes is facilitated.

According to the second aspect of the present invention, since all the open end surfaces can be exposed by opening the cover, a maintenance process for the hollow fiber membranes is more easily performed.

According to the third aspect of the present invention, since the guide portion of the housing body and the guide portion of the cover are fastened with the fastening member, the cover can be easily opened and closed.

According to the fourth aspect of the present invention, it is possible to increase surface pressure of a joining portion between the housing body and cover and to reliably perform locking by using the dovetail groove of the fastening member.

According to the fifth aspect of the present invention, when the fastening member is removed from each guide portion, the guide portion functions as a part which prevents a liquid to be treated from running around the joining portion, and thus it is possible to suppress contamination of the joining portion.

According to the sixth aspect of the present invention, since a friction force is reduced when the fastening member is detached, only a small force is required for the detachment.

DESCRIPTION OF EMBODIMENTS (First Embodiment)

Hereinafter, embodiments of the present invention will be described in detail with reference to the drawings.

Figure 1:
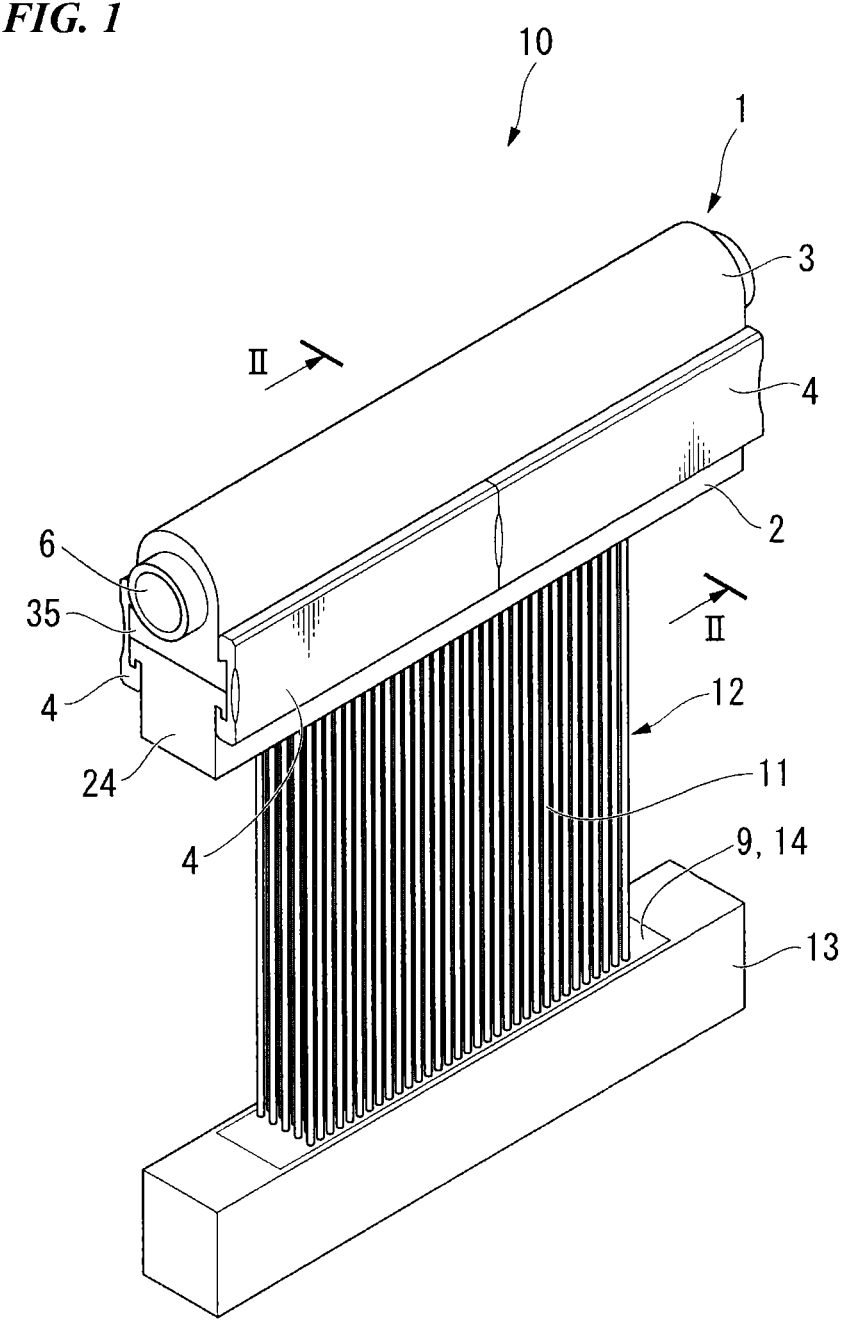
FIG. 1 is a perspective view of a flat hollow fiber membrane module according to a first embodiment of the present invention.
Figure 2:
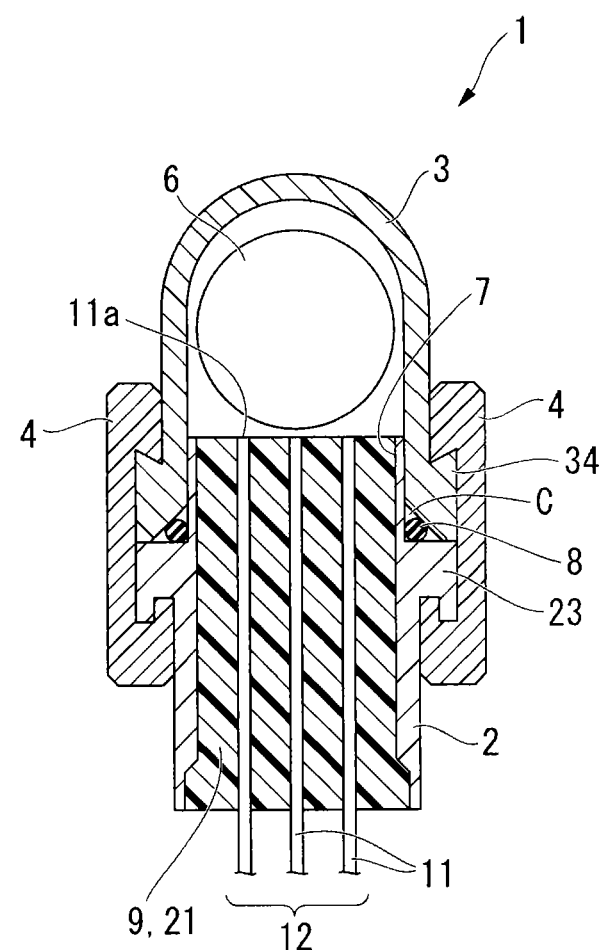
FIG. 2 is a cross-sectional view of the flat hollow fiber membrane module taken along the line II-II of FIG. 1.
Figure 3:
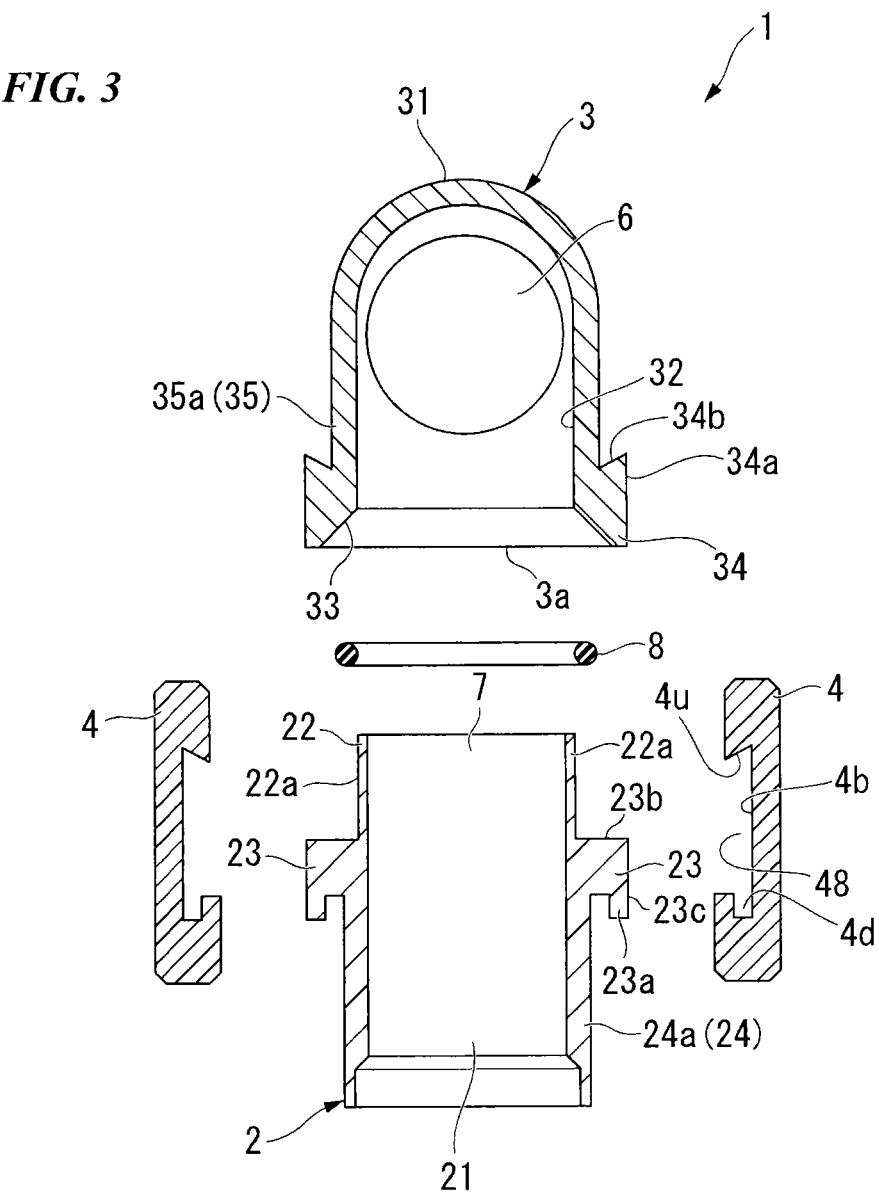
FIG. 3 is an exploded cross-sectional view of a housing for the flat hollow fiber membrane module.

FIG. 1 is a perspective view of a flat hollow fiber membrane module according to the embodiment of the present invention. FIG. 2 is a cross-sectional view of the flat hollow fiber membrane module taken along the line II-II of FIG. 1. FIG. 3 is an exploded cross-sectional view of a housing for the flat hollow fiber membrane module. In the following description, it is assumed that the top in FIGS. 2 and 3 is an upper side, and the bottom therein is a lower side.

As shown in FIG. 1, a flat hollow fiber membrane module 10 according to the present embodiment includes a hollow fiber membrane sheet form assembly 12 formed by a plurality of hollow fiber membranes 11, and a first housing 1 and a second housing 13 into which end parts of the hollow fiber membrane sheet form assembly 12 are inserted.

The hollow fiber membrane sheet form assembly 12 is formed by bundling a plurality of hollow fiber membranes 11 such that the hollow fiber membrane has a longitudinal cross-section with an elongate rectangular shape. The end parts of the hollow fiber membrane sheet form assembly 12 are fixed by a potting resin 9 (fixing resin), and the potting resin 9 seals an insertion opening 21 (refer to FIG. 2) of the first housing 1 and an insertion opening 14 of the second housing 13 so as to maintain the respective housings 1 and 13 in a hollow state.

The first housing 1 includes a housing body 2, a cover 3, and fastening members 4 two of which are respectively installed on both side surfaces in a longitudinal direction of the housing body 2 and the cover 3. The four fastening members 4 fasten the housing body 2 and the cover 3 by inserting a flange guide portion 23 and a guide portion 34 described later of the housing body 2 and the cover 3 thereinto. Filtrate outlets 6 are provided on both side surfaces of the end parts of the cover 3.

Next, the first housing 1 according to the present embodiment will be described in detail with reference to FIGS. 2 and 3.

The housing body 2 is a rectangular box-shaped member which has a length so as to correspond to the width direction of the flat hollow fiber membrane module 10, that is, a direction perpendicular to the hollow fiber membranes, and has the insertion opening 21 of the hollow fiber membrane sheet form assembly 12 on the lower part and has an opening portion 7 on an opposite side to the insertion opening 21. The opening portion 7 is formed in the longitudinal direction of the hollow fiber membranes 11 and in the longitudinal direction of the first housing 1. The insertion opening 21 and the opening portion 7 are spatially connected to each other, and the inner surface of the insertion opening 21 and the inner surface of the opening portion 7 are continuously formed.

The insertion opening 21 of the housing body 2 has an end part side which is slightly expanded, and thus facilitates an insertion work of the end part of the hollow fiber membrane sheet form assembly 12.

The opening portion 7 of the housing body 2 is used to expose all of open end surfaces 11a of the hollow fiber membranes forming the inserted hollow fiber membrane sheet form assembly 12 to outside, and a guide wall 22 is provided so as to extend upward from the opening portion 7. Here, the exposure indicates a state in which the open end surfaces of the hollow fiber membranes can be observed when the cover is removed.

With respect to an outer wall 24 forming the insertion opening 21, the flange guide portion 23 (guide portion) is provided on an outer wall 24a formed in the longitudinal direction of the first housing 1, so as to protrude from the outer wall 24a.

The end part of the flange guide portion 23 in the protruding direction (the horizontal direction of FIG. 2) forms a projection 23a which extends downward. In addition, the flange guide portion 23 is provided so as to extend over the entire longitudinal direction of the housing body 2.

A corner between an upper surface 23b of the flange guide portion 23 and an outer surface 22a of the guide wall 22 forms a seal surface of a seal member 8 described later.

The cover 3 which blocks the opening portion 7 of the housing body 2 is provided on the guide wall 22 so as to be attachable and detachable.

The cover 3 is a member which receives the guide wall 22 of the housing body 2 and has an arc-shaped upper surface 31 formed in the longitudinal direction of the first housing 1. An inner surface 32 of the cover 3 which receives the guide wall 22 of the housing body 2 has a chamfered portion 33 which functions as a seal surface expanding outward on the front end side. A corner formed by the chamfered portion 33, and the above-described outer surface 22a of the guide wall 22 and upper surface 23b of the flange guide portion 23 forms a seal space C (refer to FIG. 2) of which a cross-section has a triangular shape.

The guide portion 34 is provided on an outer wall 35a in the longitudinal direction in an outer wall 35 forming the cover 3 and on a lower edge 3a side of the cover 3, so as to protrude from the outer wall 35a. In the same manner as the flange guide portion 23 of the housing body 2, the guide portion 34 is provided so as to extend over the entire longitudinal direction of the cover 3.

In addition, an outer edge 34a of the guide portion 34 is formed so as to be coplanar with an outer edge 23c of the flange guide portion 23. Therefore, the seal space C is disposed at a position which is distant further inward than the coplanar outer edges 23c and 34a (a contact portion with a groove bottom 4b described later) in a state in which the housing body 2 is assembled with the cover 3.

The guide portion 34 is formed such that the height from the lower edge 3a of the cover 3 (the dimension directed upward from the lower edge 3a) gradually increases in the protruding direction, that is, in a fan shape. In other words, the guide portion has a shape in which the width increases outward. Thus, the upper surface 34b of the guide portion 34 is tilted inward.

The opening portion 7 of the housing body 2 is blocked by installing the cover 3 such that the upper surface 23b of the flange guide portion 23 is allowed to come into contact with the lower edge 3a of the guide portion 34. In addition, a circular seal member 8 is inserted into the seal space C, and the diameter of the seal member 8 is slightly larger than the inscribed circle of the seal space C. Therefore, when the cover 3 is installed in the housing body 2, the seal member is pressed by three surfaces so as to obtain sufficient liquid tightness.

The housing body 2 and the cover 3 are fastened by the fastening members 4. The fastening members 4 are disposed so as to cover joining parts of both side surfaces in the longitudinal direction of the first housing 1 of joining parts between the upper surface 23b of the flange guide portion 23 and the lower edge 3a of the cover 3. Two fastening members 4 are provided on each of both side surfaces of the first housing 1, and the length of each of the fastening members 4 in the longitudinal direction is approximately a half length of the first housing 1 in the longitudinal direction.

The fastening member 4 has a groove 48 which receives the flange guide portion 23 and the guide portion 34 together. The groove 48 has a shape in which the inside is wider, that is, the width of the groove bottom is larger than the width of the groove upper surface, and the groove 48, and the flange guide portion 23 and the guide portion 34 have a shape of being fitted to each other. In other words, the groove 48 is formed of a linear groove bottom 4b corresponding to the outer edges 23c and 34a, a fan-shaped tilt surface 4u of which the width gradually increases inward and which is formed at the upper end of the groove bottom 4b, and a concave groove 4d which is stepwise formed at the lower end of the groove bottom 4b such that the width increases.

The tilt surface 4u is fitted to the upper surface 34b of the guide portion 34, and the concave groove 4d is fitted to the projection 23a of the flange guide portion 23. Thus, the seal member 8 is appropriately compressed, and the housing body 2 and the cover 3 tighten a liquid. In addition, the fastening member 4 holds a position with a repulsive force of the seal member 8 and a friction force of the groove portion.

Next, an operation of the flat hollow fiber membrane module 10 according to the present embodiment will be described.

If a filtration operation is to be performed using the flat hollow fiber membrane module 10, the hollow portion of the first housing 1 is connected to an external water collecting pipe, and further the water collecting pipe is connected to suction means such as a pump. In addition, when the flat hollow fiber membrane module 10 is installed in a treatment vessel which is filled with a liquid to be treated, and the suction means is operated, the hollow portion in the first housing 1 has a negative pressure via the water collecting pipe, thus the liquid to be treated is filtrated through the hollow fiber membranes 11, and thereby a filtrate thereof reaches the hollow portion from the end parts of the hollow fiber membranes 11 and is then recovered from the water collecting pipe.

For example, in a case where the open end surfaces 11a of the hollow fiber membranes 11 are required to be exposed since any one of the hollow fiber membranes 11 is expected to be damaged, all the fastening members 4 are slid in the longitudinal direction of the first housing 1, and thereby the fastening members 4 are detached from the first housing 1. After the fastening members 4 are detached, the cover 3 is pulled upward and is opened, thereby separating the cover 3 from the housing body 2. Thus, the open end surfaces 11a of the hollow fiber membranes 11 can be exposed from the opening portion 7 of the housing body 2 such that the open end surfaces 11a are observed, and an open end surface of a damaged hollow fiber membrane is found and is sealed with a repairing material, thereby repairing the membrane module.

As materials of the housing body 2, the cover 3, and the fastening member 4 forming the first housing 1, materials with a mechanical strength and durability may be used, for example, resin materials such as polycarbonate, polysulfone, polyolefin (polyethylene, polypropylene, or the like), PVC (polyvinyl chloride), an acryl resin, an ABS resin, and modified PPE (polyphenylene ether), or metal materials such as a stainless steel such as SUS304 and an aluminum material, may be used.

Here, the hollow fiber membranes 11 may use, for example, cellulose-based, polyolefin-based, polyvinyl alcohol-based, polymethyl methacrylate-based, polysulfone-based, polyvinylidene fluoride-based, polyethylene fluoride-based, polyacrylonitrile-based, and ceramic-based hollow fiber membranes, and the like. In addition, a hole diameter, a porosity, a film thickness, an outer diameter, and the like of the hollow fiber membrane 11 are appropriately selected depending on a purpose of using the flat hollow fiber membrane module so as to choose the hollow fiber membranes 11.

Hardness of material of the seal member 8 is appropriately defined depending on circumstances in which the flat hollow fiber membrane module 10 is used, the diameter of the seal member 8, or the like, and is preferably 70 degrees or less at Shore A hardness after ten seconds when liquid tightness is taken into consideration. If the hardness is too high, blocking using the cover 3 may be hindered due to a repulsive force.

A material of the seal member 8 may use rubber such as silicone rubber, fluorine rubber, and acrylonitrile butadiene rubber (NBR), or an elastomer from the viewpoint that they can exhibit high liquid tightness with a repulsive force against pressing.

According to the above-described embodiment, the cover can be detached by sliding the fastening members 4 in the longitudinal direction of the first housing 1 so as to be removed. Thus, the open end surfaces 11a of the hollow fiber membranes 11 are exposed from the opening portion 7 of the housing body 2, and thereby it is possible to easily seal damaged open end surfaces 11a, for example, when some of the hollow fiber membranes 11 are damaged.

A shape of groove engagement of the housing body 2 side is the concave groove 4d so as to expand in the width direction, and thereby it is possible to reduce a stress which is applied in a direction in which the insertion opening 21 of the housing body 2 expands and to thus further suppress deformation of the potting resin portion which fixes the hollow fiber membrane sheet form assembly when fastened by the fastening member 4.

In addition, since the chamfered portion 33 for inserting the seal member 8 is formed on the cover 3 side, a force which is applied in a direction in which the first housing 1 expands is applied only to the cover 3 and is not applied to the housing body 2 when the cover 3 is installed in the housing body 2. Therefore, deformation of the housing due to installation of the cover 3 does not exert influence on fixing of the hollow fiber membrane sheet form assembly 12.

In addition, the upper surface 34b of the guide portion 34 is a tilt surface which decreases toward the outer wall 35 of the cover 3 from the outer edge 34a, and thereby a liquid to be treated which has not been filtrated is temporarily held in a space which prevents run-around of the liquid between the upper surface 34b and the outer wall 35 of the cover 3 when the fastening member 4 is slid. Thus, it is possible to prevent a contaminated liquid to be treated from reaching the joining portion between the cover 3 and the housing body 2.

Further, the seal space C formed by the corners of the chamfered portion 33, the outer surface 22a of the guide wall 22, and the upper surface 23b of the flange guide portion 23 described above is disposed at a position which is distant further inward than the coplanar outer edges 23c and 34a, and thereby a liquid to be treated which has not been filtrated is prevented from penetrating such that contamination of the inside can be suppressed to the minimum.

In addition, in relation to the fastening member 4, the length thereof is approximately a half length of the first housing 1 in the longitudinal direction, and two fastening members 4 are provided on each of both side surfaces of the first housing 1. Thus, a friction force is reduced when the fastening members 4 are detached, and thereby only a small force is required for detachment.

(Second Embodiment)

Figure 4:
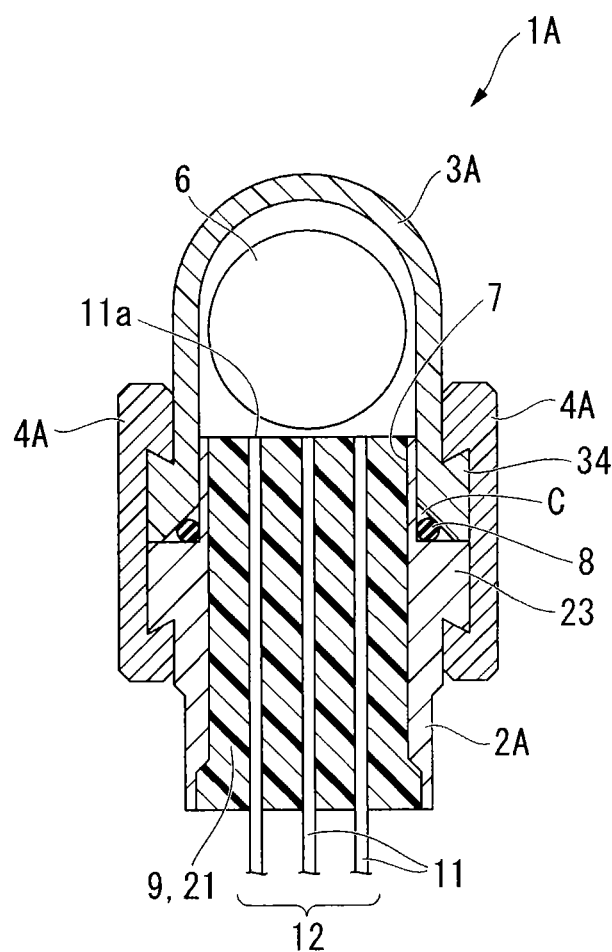
FIG. 4 is a cross-sectional view of a flat hollow fiber membrane module according to a second embodiment of the present invention.

Next, a flat hollow fiber membrane module according to a second embodiment of the present invention will be described. FIG. 4 is a cross-sectional view of a flat hollow fiber membrane module according to the second embodiment of the present invention. In addition, a description will be made based on differences between the present embodiment and the above-described embodiment, and description of the same part will be omitted.

As is clear from FIG. 4, in the flat hollow fiber membrane module according to the second embodiment, a shape of an fitting portion of a fastening member 4A, and a housing body 2A and a cover 3A, that is, a shape of the fitting portion to the flange guide portion 23 and the guide portion 34 is a dovetail-groove shape which has a fan shape. The dovetail-groove shape indicates a shape in which a cross-section of the groove is trapezoidal, and the width of the groove bottom is larger than the width of the groove upper surface.

As above, shapes of the fitting portion are unified to the dovetail-groove shape, and thereby it is possible to further reduce a force required to insert the fastening member 4A. In addition, in a case where the first housing 1A is manufactured through mechanical processing, it is possible to more simplify manufacturing steps.

Figure 7:
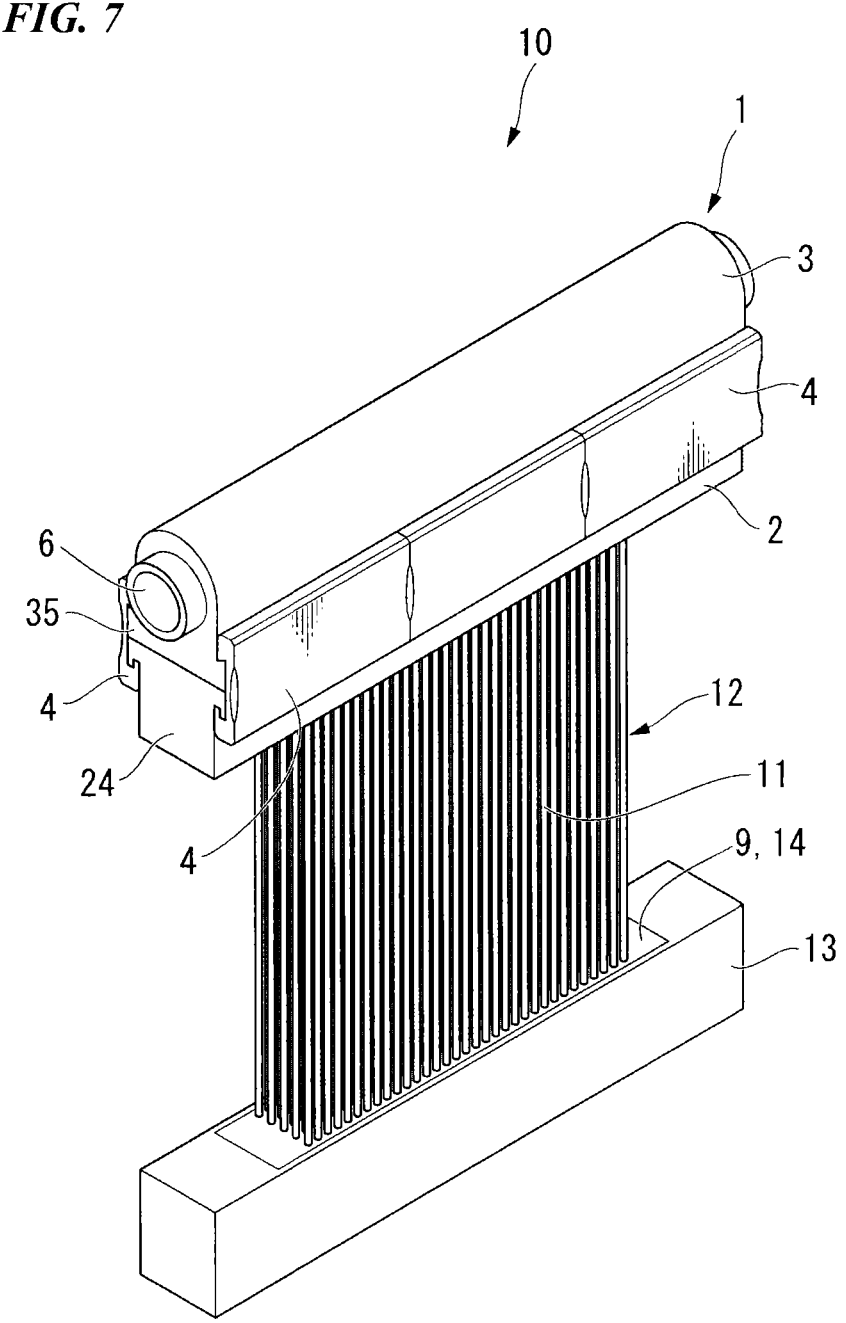
FIG. 7 is a perspective view of a flat hollow fiber membrane module in which a fastening member is divided into three parts.

In addition, the number of the fastening members 4 provided on each of both side surfaces is not limited to two, and may be one, or may be three as shown in FIG. 7.

Figure 8:
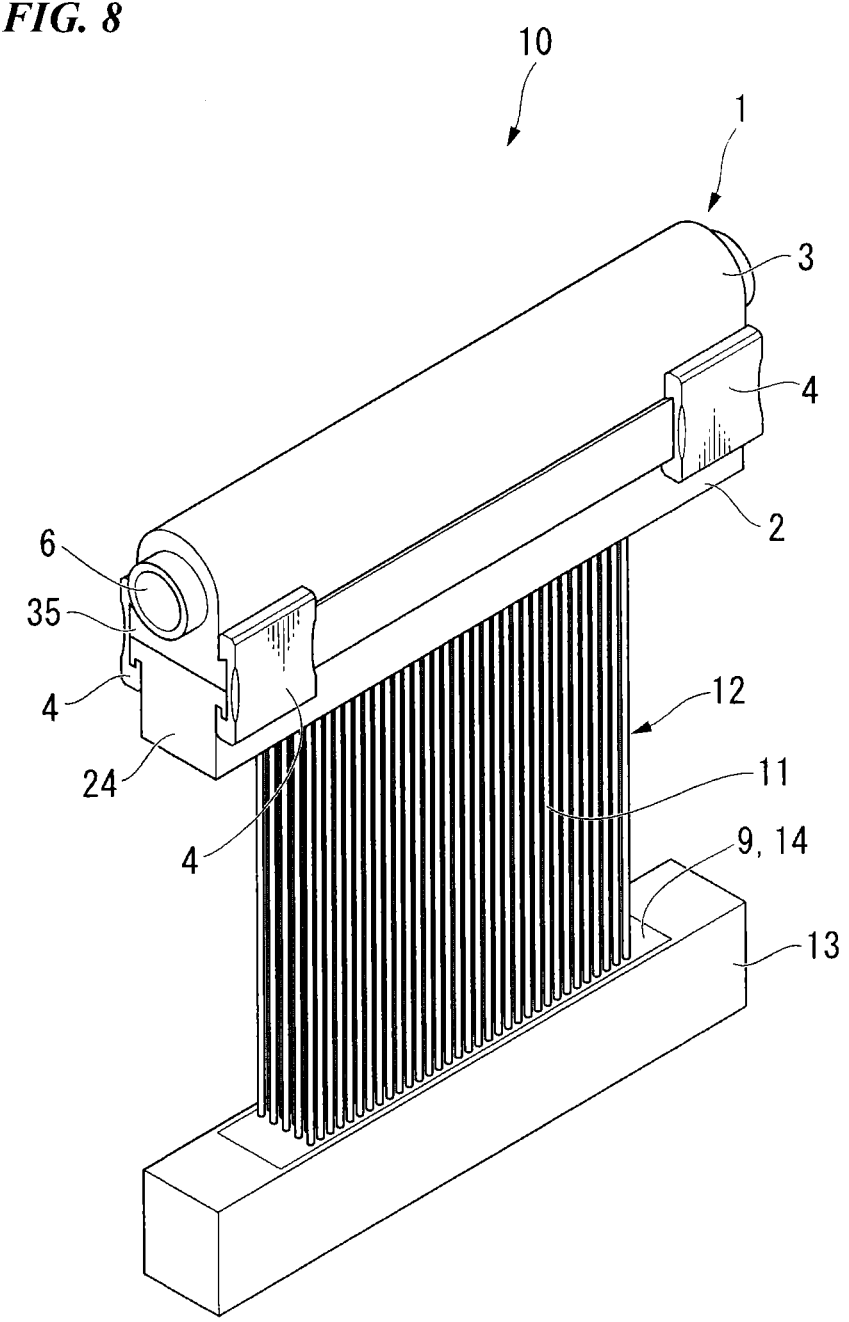
FIG. 8 is a perspective view of a flat hollow fiber membrane module in which a fastening member fastens only one end side and the other end side of a housing.

Further, the fastening member 4 is not necessarily provided over the entire side surface of the first housing 1A, and may have a configuration in which only one end side and the other end side are fastened in the longitudinal direction of the first housing 1A as shown in FIG. 8.

(Third Embodiment)

Next, a flat hollow fiber membrane module according to a third embodiment of the present invention will be described. In addition, a description will be made based on differences between the present embodiment and the above-described embodiment, and description of the same part will be omitted.

A first housing 1B of the flat hollow fiber membrane module according to the third embodiment is common to those according to the first and second embodiments in that an opening portion 7 of a housing body 2B can be blocked so as to be allowed to be opened and closed by a cover 3B, but a method of fastening the cover 3B and the housing body 2B is different from those of the first and second embodiments.

Figure 5:
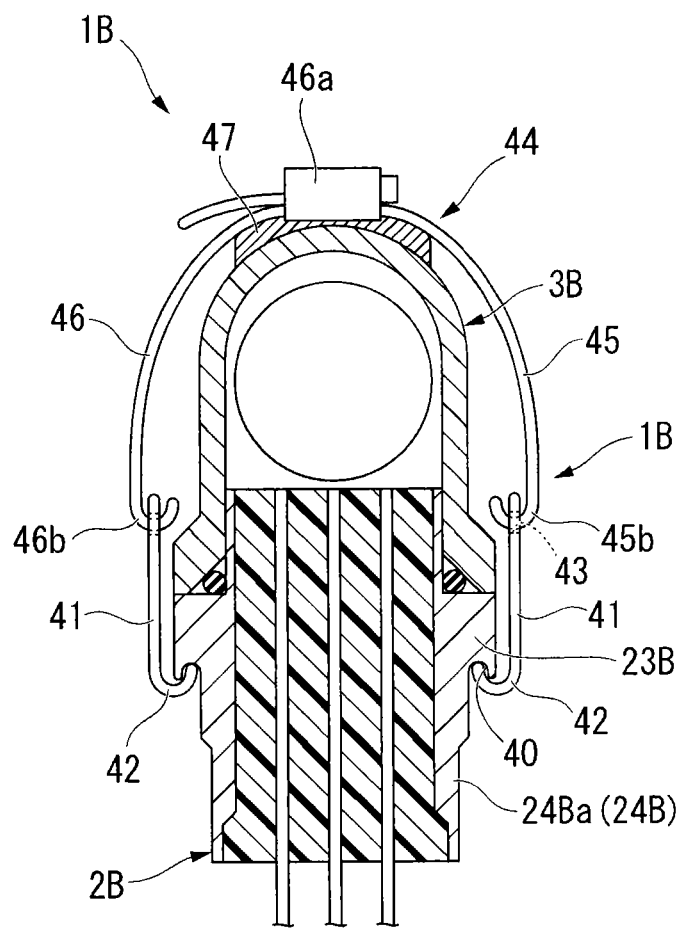
FIG. 5 is a cross-sectional view of a flat hollow fiber membrane module according to a third embodiment of the present invention.

As shown in FIG. 5, a flange portion 23B is provided on an outer wall 24Ba in the longitudinal direction of the first housing 1B in an outer wall 24B of the housing body 2B, so as to protrude from the outer wall 24Ba. A concave groove 40 is formed on a lower surface of the flange portion 23B in the longitudinal direction of the first housing 1B.

Hook plates 41 and 41 which are formed of steel plates such as SUS are disposed on both sides of the cover 3B and the housing body 2B in the longitudinal direction. Each hook plate 41 has a length which covers both sides of the first housing 1B, and a lower end thereof forms a hook portion 42 which is curved in a hook shape toward the first housing 1B. The hook portion 42 is formed to be engaged with the concave groove 40 of the flange portion 23B. In addition, three band installation holes 43 into which hook portions 45b and 46b of a band 44 described later are inserted are formed on the upper part of the hook plate 41 at the substantially same interval over the longitudinal direction of the hook plate 41.

The hook plates 41 and 41 are held by three bands 44 (only one band 44 is shown in FIG. 5). Each band 44 includes a first band 45 and a second band 46, and the first band 45 and the second band 46 are respectively formed of steel plates such as SUS which is formed in a strip shape.

The first band 45 and the second band 46 are connected to each other via a connection mechanism which is used in a so-called binding band. Specifically, a plurality of engaging claws are formed on the surface of the first band 45, and one end side of the first band 45 is inserted into a lock portion 46a formed on one end side of the second band 46, and thereby the first band 45 and the second band 46 are connected to each other so as to adjust their lengths. The engaging claw portion of the first band 45 is engaged with engaging claws (not shown) of the lock portion 46a, and is locked thereto such that the length of the band 44 does not increase any more. In addition, a cancel button 46c is provided in the lock portion 46a, and locking can be canceled by pushing the button.

Hook portions 45b and 46b which are curved in a hook shape are formed on the other end sides of the first band 45 and the second band 46. As described above, the hook portions 45b and 46b are respectively inserted into band installation holes 43 of the hook plates 41 and 41 such that the hook plate 41 is engaged with the band 44. Further, a buffer material 47 formed of rubber or the like is interposed between the band 44 and the cover 3B.

According to the above-described embodiment, one end of the first band 45 is pulled from the lock portion 46a of the second band 46 so as to be separated, thereby reducing the length of the band 44 (the length from the hook portion 45b to the hook portion 46b). Thus, the length between the hook portions 42 of the hook plates 41 engaged with the concave grooves 40 of the housing body 2B is reduced, thereby fastening the cover 3B with the band 44.

In addition, locking of the locking portion 46a to the band 44 is canceled so as to release engagement between the band 44 and the hook plate 41, thereby detaching the cover 3B. Thus, the open end surfaces 11a of the hollow fiber membranes 11 are exposed from the opening portion 7 of the housing body 2B.

In addition, the buffer material 47 is elastic, and thus it is possible to prevent the band 44 from loosening.

In the present embodiment, with the above-described configuration, locking of the locking portion 46a to the band 44 is canceled so as to release engagement between the band 44 and the hook plate 41, thereby detaching the cover 3B more simply. In addition, since there is no sliding mechanism, it is possible to perform a maintenance work even in a restricted space.

Further, a fastening method in the first to third embodiments is not limited to the above-described methods, and, for example, a fixing fitting which is generally called a "draw latch" may be used as a member for fastening the housing body 2 and the cover 3. Such a fastening member is appropriately selected depending on a production volume or costs of housings.

(Fourth Embodiment)

Next, a flat hollow fiber membrane module according to a fourth embodiment of the present invention will be described. In addition, a description will be made based on differences between the present embodiment and the above-described embodiment, and description of the same part will be omitted.

Figure 6:
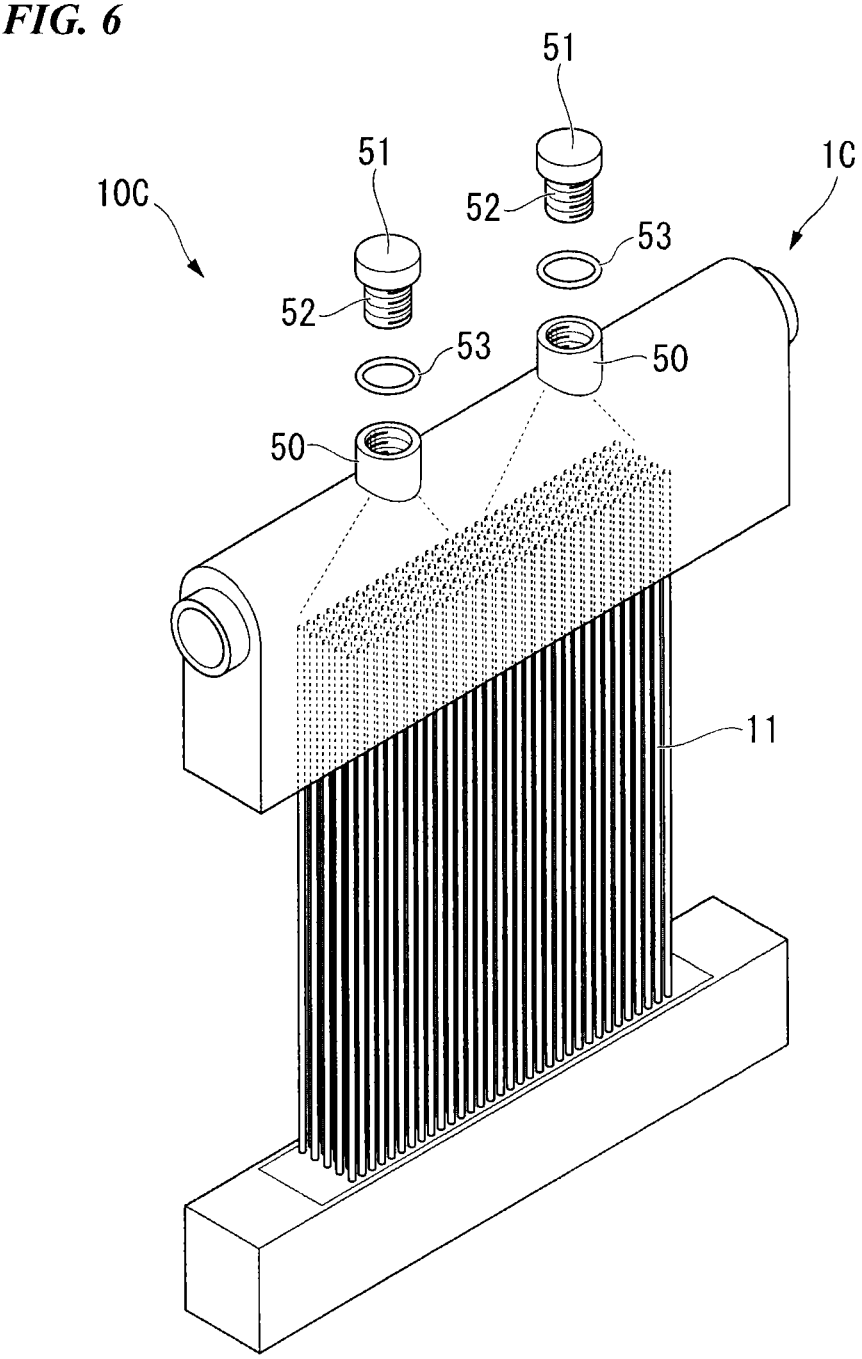
FIG. 6 is a perspective view of a flat hollow fiber membrane module according to a fourth embodiment of the present invention.

As shown in FIG. 6, a first housing 1C of a flat hollow fiber membrane module 10C according to the present embodiment includes two opening portions 50 and 50 which are integrally formed. Each opening portion 50 protrudes upward on the upper part of the first housing 1C, and is formed in a cylindrical shape. A screw groove corresponding to a screw portion of a cover portion 51 described later is formed on the inner wall of the opening portion 50.

A position where the opening portion 50 is formed and an opening diameter thereof are set to a position and a dimension in which the open end surfaces of the hollow fiber membranes 11 can be observed over the entire range and maintenance can be performed via the two opening portions 50.

Cover portions 51 and 51 have a disk shape for blocking the opening portions 50 and 50, and a screw projection 52 corresponding to the screw groove of each opening portion 50 protrudes on the lower surface thereof The cover portion 51 is installed in the opening portion 50 via an O ring 53 between the lower surface of the cover portion 51 and the upper surface of the opening portion 50.

According to the above-described embodiment, since the open end surfaces of the hollow fiber membranes 11 can be observed from the two opening portions 50, and further the open end surfaces can be accessed via the opening portions 50, damaged open end surfaces can be sealed when some of the hollow fiber membranes 11 are damaged. In addition, the opening portion 50 has the minimum size for observing the open end surfaces, and thus it is possible to further increase stiffness of the first housing 1C. Further, since the opening portion 50 is small, the first housing 1C and the cover portion 51 can be easily made to be in a liquid-tight state.

INDUSTRIAL APPLICABILITY

According to the present invention, when the cover is opened, and the open end surfaces of the hollow fiber membranes are observed, it is most easily checked whether or not the filtration surfaces are damaged. Therefore, a damaged state of the hollow fiber membranes can be easily checked and a maintenance process such as sealing the open end surfaces of the hollow fiber membranes is facilitated.

REFERENCE SIGNS LIST

1 First housing
2 Housing body
3 Cover
4 Fastening member
6 Filtrate outlet
7 Opening portion
8 Seal member
9 Potting resin (fixing resin)
10 Flat hollow fiber membrane module
11 Hollow fiber membrane
11a Open end surface
12 Hollow fiber membrane sheet form assembly
13 Second housing
14 Insertion opening
21 Insertion opening
22 Guide wall
23 Flange guide portion (guide portion)
34 Guide portion (guide portion)
23c, 34a Outer edge (contact portion)
48 Groove
C Seal space

The invention claimed is:

1. A hollow fiber membrane module, comprising:
a plurality of hollow fiber membranes that are arranged in a sheet form;
a housing that fixes the hollow fiber membranes and comprises a housing body and a cover; and
a pair of fastening members that are configured to fasten a joining portion between the housing body and the cover and extend in a width direction of the hollow fiber membrane module,
wherein
each of the fastening members comprises a groove extending in a longitudinal direction of the fastening member, where a width of the groove increases toward inside of the groove,
each of the housing body and the cover comprises guide portions configured to fit the groove when being covered by the fastening member,
the guide portion of the housing body and the guide portion of the cover have different shapes,
the groove comprises a flat bottom, a tilt surface, and a stepwise surface,
the guide portion of the housing body is configured to contact at least a part of the flat bottom and the stepwise surface of the groove,
the guide portion of the cover is configured to contact at least a part of the flat bottom and the tilt surface of the groove,
the housing body comprises
an insertion opening into which end parts of the plurality of hollow fiber membranes are inserted and sealed by a fixing resin, and
an opening portion formed in a longitudinal direction of the plurality of hollow fiber membranes to enable maintenance of open end surfaces of the plurality of hollow fiber membranes,
the cover openably and closeably covers the opening portion of the housing body,
the opening portion of the housing body is formed in the longitudinal direction along the housing, and
the opening portion of the housing body exposes the entire open end surfaces of at least one side of the plurality of hollow fiber membranes.

2. The hollow fiber membrane module according to claim 1, wherein each of the guide portions of the cover and the housing body has a shape of which a width increases toward an outside of the guide portion.

3. The hollow fiber membrane module according to claim 2, wherein the fastening member is divided into two or more pieces in the longitudinal direction of the fastening member.

4. The follow fiber membrane module according to claim 3, wherein the housing further comprises a seal member between the guide portion of the housing body and the guide portion of the cover.

5. The follow fiber membrane module according to claim 4, wherein the seal member comprises a rubber or an elastomer.

6. The follow fiber membrane module according to claim 5, wherein the seal member comprises a silicone rubber, a fluorine rubber, or an acrylonitrile butadiene rubber.

7. The follow fiber membrane module according to claim 2, wherein the housing further comprises a seal member between the guide portion of the housing body and the guide portion of the cover.

8. The hollow fiber membrane module according to claim 7, wherein the fastening member is divided into two or more pieces in the longitudinal direction of the fastening member.

9. The follow fiber membrane module according to claim 7, wherein the seal member comprises a rubber or an elastomer.

10. The follow fiber membrane module according to claim 9, wherein the seal member comprises a silicone rubber, a fluorine rubber, or an acrylonitrile butadiene rubber.

11. The hollow fiber membrane module according to claim 1, wherein the fastening member is divided into two or more pieces in the longitudinal direction of the fastening member.

12. The follow fiber membrane module according to claim 11, wherein the housing further comprises a seal member between the guide portion of the housing body and the guide portion of the cover.

13. The follow fiber membrane module according to claim 12, wherein the seal member comprises a rubber or an elastomer.

14. The follow fiber membrane module according to claim 13, wherein the seal member comprises a silicone rubber, a fluorine rubber, or an acrylonitrile butadiene rubber.

15. The follow fiber membrane module according to claim 1, wherein the housing further comprises a seal member between the guide portion of the housing body and the guide portion of the cover.

16. The follow fiber membrane module according to claim 15, wherein the seal member comprises a rubber or an elastomer.

17. The follow fiber membrane module according to claim 16, wherein the seal member comprises a silicone rubber, a fluorine rubber, or an acrylonitrile butadiene rubber.

18. The follow fiber membrane module according to claim 1, wherein the guide portion of the cover has a chamfered portion.

19. The hollow fiber membrane module according to claim 18, wherein the fastening member is divided into two or more pieces in the longitudinal direction of the fastening member.

* * * * *